United States Patent
Oles

(10) Patent No.: US 8,356,991 B2
(45) Date of Patent: Jan. 22, 2013

(54) ROTARY BLOW MOLDING MACHINE WITH MOVABLE CLAMP ASSEMBLIES AND METHOD

(75) Inventor: Paul M. Oles, York, PA (US)

(73) Assignee: Graham Engineering Corporation, York, PA (US)

( * ) Notice: Subject to any disclaimer, the term of this patent is extended or adjusted under 35 U.S.C. 154(b) by 160 days.

(21) Appl. No.: 12/721,631

(22) Filed: Mar. 11, 2010

(65) Prior Publication Data
US 2010/0230868 A1 Sep. 16, 2010

Related U.S. Application Data

(60) Provisional application No. 61/159,469, filed on Mar. 12, 2009.

(51) Int. Cl.
*B29C 49/04* (2006.01)
*B29C 49/00* (2006.01)
*B29C 49/36* (2006.01)

(52) U.S. Cl. ........ 425/532; 264/543; 425/541; 425/503; 425/451.4

(58) Field of Classification Search .................. 264/467, 264/540, 541, 451.4, 522, 538, 503, 532; 425/503, 532, 540, 467, 541, 451.4, 522, 425/538
See application file for complete search history.

(56) References Cited

U.S. PATENT DOCUMENTS

| | | | |
|---|---|---|---|
| 2,750,625 A * | 6/1956 | Colombo | 425/536 |
| 3,035,302 A | 5/1962 | Lysobey | |
| 3,310,834 A | 3/1967 | Simpson et al. | |
| 3,635,636 A | 1/1972 | Lagoutte | |
| 3,685,938 A | 8/1972 | Lagoutte | |
| 3,764,250 A * | 10/1973 | Waterloo | 425/528 |
| 3,872,203 A * | 3/1975 | Yoshikawa et al. | 264/532 |
| 3,969,059 A | 7/1976 | Michel | |
| 3,994,655 A * | 11/1976 | Edwards et al. | 425/526 |
| 4,036,925 A * | 7/1977 | Kauffman et al. | 264/532 |
| 4,604,044 A * | 8/1986 | Hafele | 425/525 |
| 5,039,298 A * | 8/1991 | Takakusaki et al. | 425/504 |
| 5,240,718 A * | 8/1993 | Young et al. | 425/539 |
| 5,403,177 A * | 4/1995 | Priest | 425/529 |
| 5,698,241 A * | 12/1997 | Kitzmiller | 425/532 |
| 7,004,745 B2 | 2/2006 | Galloni | 425/182 |
| 7,425,124 B2 * | 9/2008 | Zoppas | 425/348 R |
| 7,638,082 B2 * | 12/2009 | Mattice et al. | 264/297.6 |
| 7,658,882 B2 * | 2/2010 | Minganti | 264/532 |
| 8,075,834 B2 * | 12/2011 | Kwasniewski et al. | 264/538 |
| 2007/0286922 A1 * | 12/2007 | Netsu | 425/540 |
| 2008/0220115 A1 * | 9/2008 | Galloni | 425/540 |
| 2012/0040037 A1 * | 2/2012 | Kwasniewski et al. | 425/150 |
| 2012/0082749 A1 * | 4/2012 | Heininger et al. | 425/540 |

FOREIGN PATENT DOCUMENTS

| | | |
|---|---|---|
| EP | 0284242 | 9/1988 |
| EP | 0423405 | 4/1991 |
| EP | 0562202 | 9/1993 |
| EP | 0858878 | 8/1998 |
| GB | 1395727 | 5/1975 |
| GB | 2205062 | 11/1988 |
| JP | 53-028662 | 3/1978 |
| JP | 53-028663 | 3/1978 |
| JP | 53129255 | 11/1978 |
| WO | 93-15898 | 8/1993 |

* cited by examiner

*Primary Examiner* — Joseph Del Sole
*Assistant Examiner* — Nahida Sultana
(74) *Attorney, Agent, or Firm* — Hooker & Habib, P.C.

(57) ABSTRACT

A continuous blow molding machine includes a mechanism for shifting molds upstream after closing to reduce between-mold flash.

28 Claims, 5 Drawing Sheets

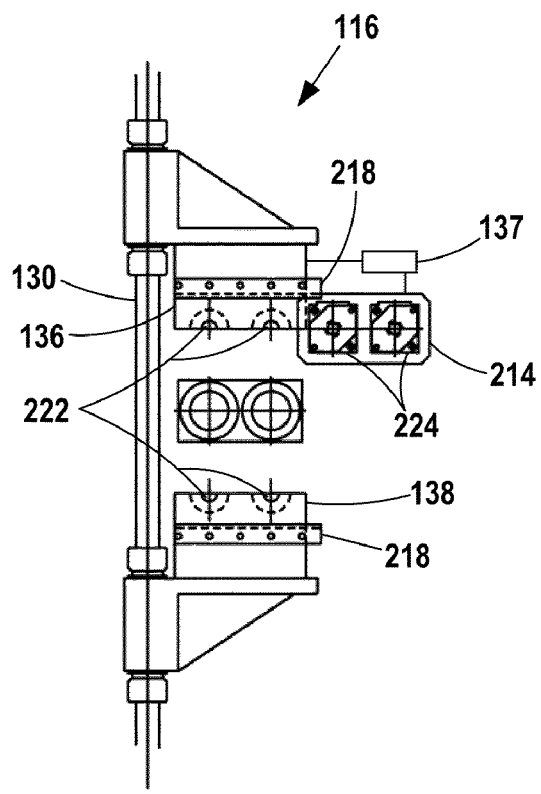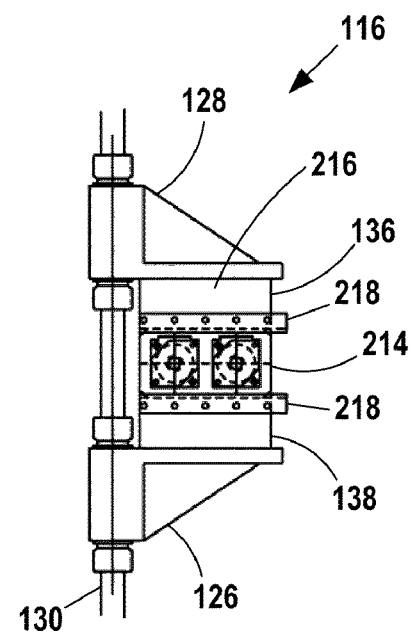
Fig. 5A    Fig. 5B
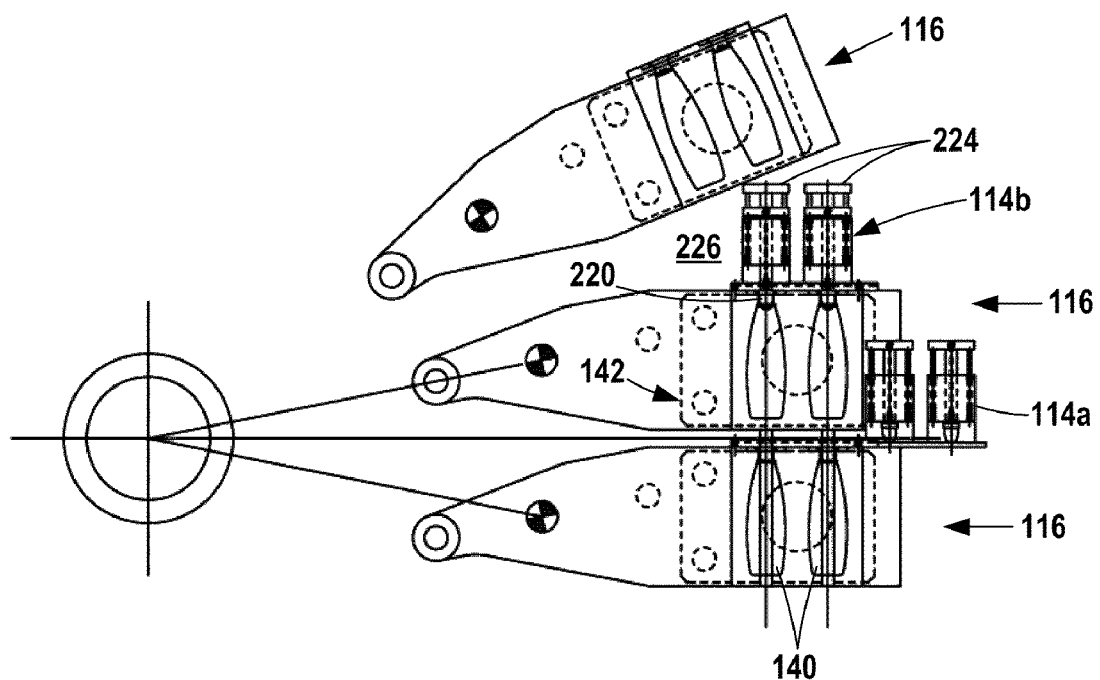
Fig. 6

ROTARY BLOW MOLDING MACHINE WITH MOVABLE CLAMP ASSEMBLIES AND METHOD

FIELD OF THE INVENTION

The invention relates to continuous rotary blow molding machines with mold clamps and to methods for blow molding articles.

DESCRIPTION OF THE PRIOR ART

Conventional continuous rotary blow molding machines extrude one or more continuous parisons for capture in cavities in adjacent molds for blow molding. Mold flash extends between mold cavities in adjacent molds and typically includes a blow dome. The flash must be cut away from the bases and necks of the bottles. The cut at the neck must be machined to form a flat surface perpendicular to the neck axis for making a seal with an applied closure. The flash is waste and must be discarded. The flash trimming and machining operations increase the cost of blow molded bottles.

In continuous rotary blow molding machines, one flow head continuously extrudes a parison for capture in each mold cavity in each mold. Parisons must be extruded at the circumferential speed of each mold cavity. The cavities are spaced radially and have different circumferential speeds. As a result, a separate parison controller is required for each flow head in order to extrude the parison at the required speed and to vary the thicknesses of the parison to obtain a desired container weight.

SUMMARY OF THE INVENTION

The invention is an improved rotary blow molding machine in which mold clamp assemblies including molds are movably mounted on a continuously rotating frame. The blow molding machine includes an assembly drive for shifting the mold clamp assemblies between upstream and downstream positions on the frame as the frame continuously rotates downstream during blow molding. Flash is reduced. Blow pins may be used to form the necks of bottles. Parison extrusion equipment is simplified.

In the improved machine each open mold is in a downstream position on the rotating frame when the mold is rotated over one or more parisons. After the rotating open mold closes to capture the parison or parisons, the assembly drive shifts the mold upstream from the downstream position to slow rotation of the mold and maintain the mold cavity or cavities in alignment with and moving above the flow heads at the same speed and in the same direction as the parisons are extruded. Upstream shifting of the closed mold continues during closing of the next mold on the parisons. Each mold holds the extruded parison or parisons in alignment during closing of the next mold.

The next upstream mold is adjacent to the previously closed mold when it closes on the parison or parisons. A parison knife on the upstream end of the previously closed mold then severs the parison or parisons between the molds. The next upstream mold then moves upstream and away from the previously closed mold to provide a gap between the molds.

Each mold clamp assembly includes a blow pin unit mounted on the mold. The blow pin unit is moveable from a retracted position away from the mold to a blow position on the downstream side of the closed mold and in a gap between molds to position a blow pin adjacent each open end of a parison segment held in a cavity in the mold. The blow pin unit is secured on its mold to permit extension of the blow pins into the open ends of the cavities to compact and firm neck finishes for the bottles and to flow compressed gas into the cavities to blow captured parison segments against the molds for forming bottles. The blow pin units remain mounted on molds with pins extended during blow molding and cooling of the blown bottles.

After the plastic in blow molded bottles has cooled and set, the blow pins are withdrawn and the blow units are retracted, the mold halves are opened and the bottle or bottles are ejected. The mold is then shifted on the frame from the upstream position back to the downstream position. The open mold in the downstream position is then moved over the flow head or flow heads and parisons to initiate a new cycle of operation.

In improved machines according to the invention using multi-cavity molds, each parison is identical and is extruded at the same rate with the same wall thickness profile using a single extruder for each plastic resin in the parison and a single flow controller for all of the flow heads. The parisons are all extruded upwardly at the same speed which is less than the circumferential speed of the mold to reduce between bottle flash.

DESCRIPTION OF THE DRAWINGS

FIG. 5A is a view taken generally along line 5A-5A of FIG. 4;

FIG. 5B is a view similar to FIG. 5A but with the mold closed and blow pin unit shifted over the mold; and FIG. 6 is an enlargement of a portion of FIG. 3.

DESCRIPTION OF THE PREFERRED EMBODIMENT

Figure 1:
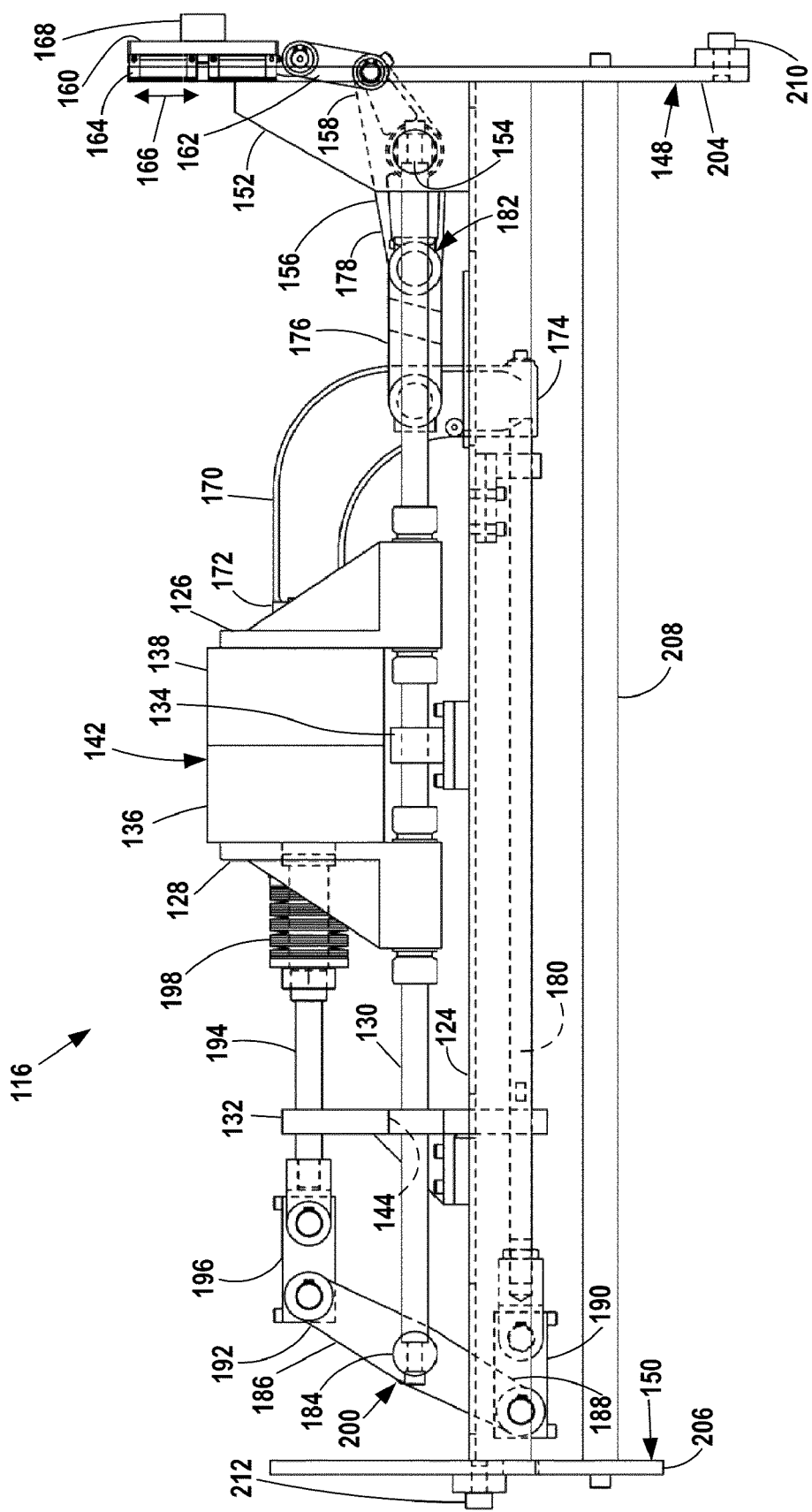
FIG. 1 is a side view of a mold clamp assembly mounted on the frame of a vertical rotary blow molding machine.

FIGS. 1 to 6 illustrate a rotary blow molding machine 100 including a rotary frame 102 having a horizontal main shaft 104 with ends journaled in bearings mounted on shaft supports 106 and 108. Three circular mounting plates 110, 112 and 114 are mounted on and rotate with shaft 104. Sixteen mold clamp assemblies 116 are mounted on the plates at circumferential locations spaced around the frame.

Figure 3:
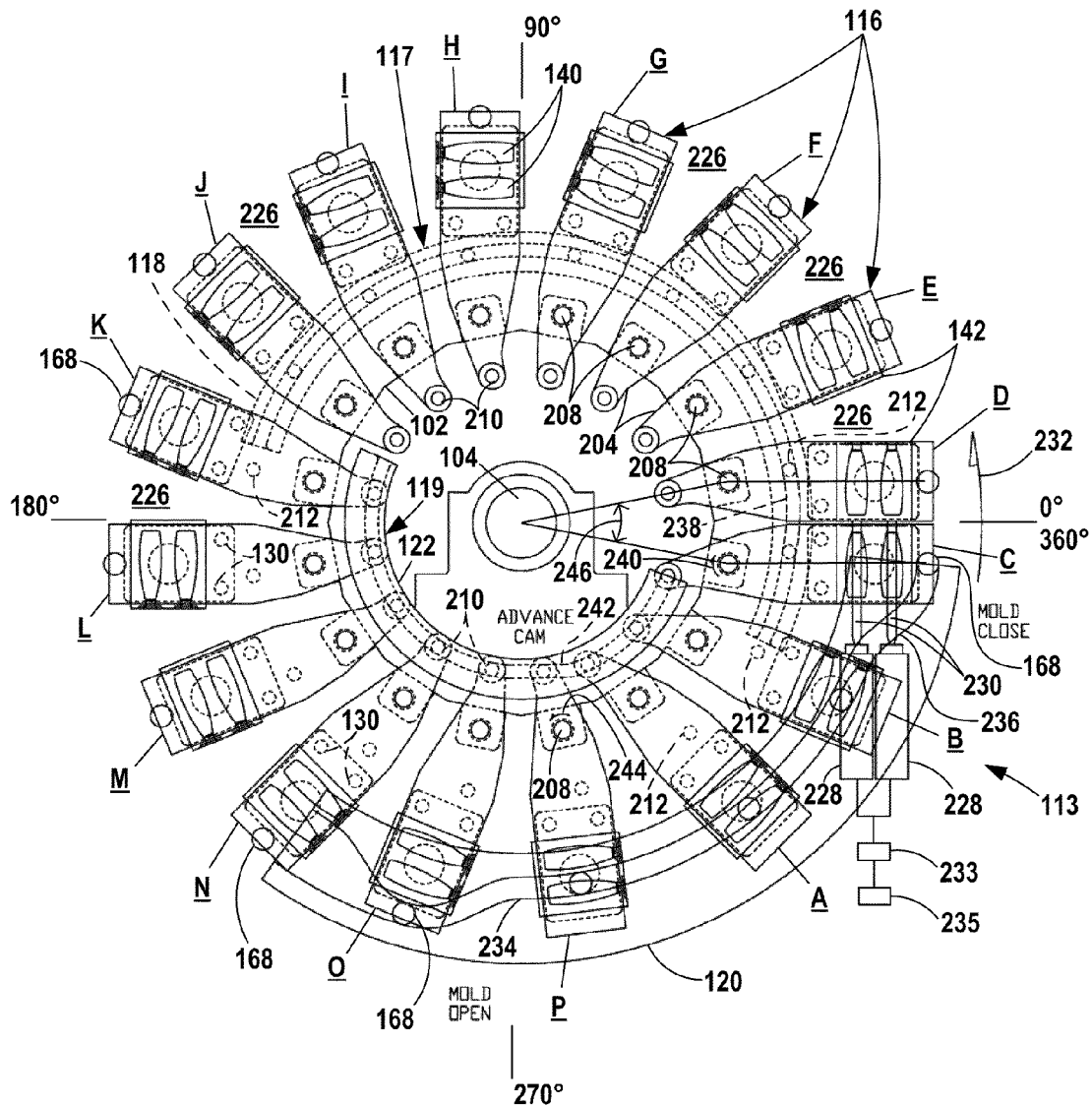
FIGS. 3 and 4 are views of the machine in FIG. 2 taken generally along lines 3-3 and 4-4.
Figure 4:
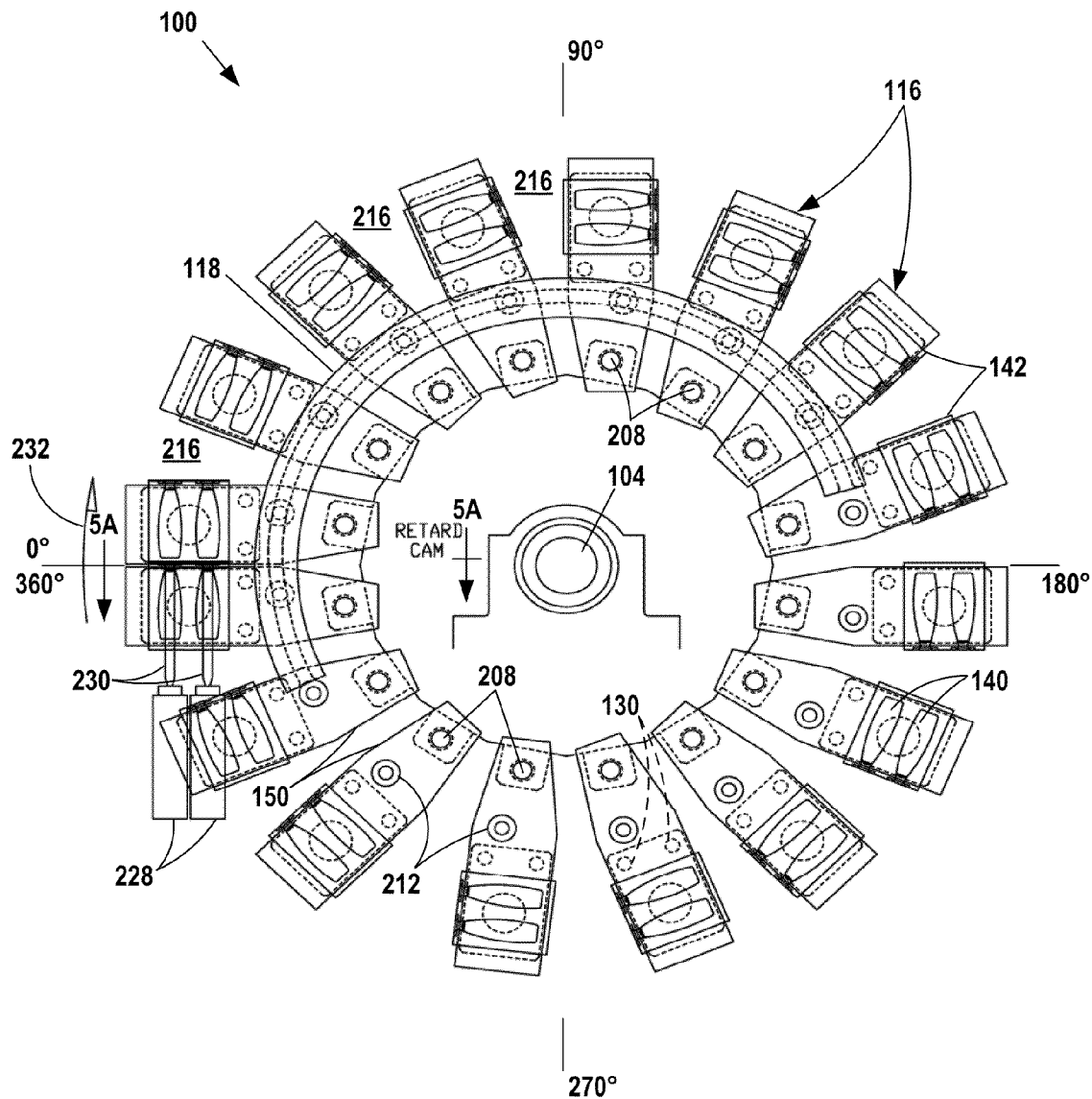

The rotary frame 102 and assemblies 116 are continually rotated around the axis of the main shaft 104 by a conventional drive 103, which may be an electric motor in the direction of arrow 232 shown in FIGS. 3 and 4. Rotation of frame 102 continuously moves the mold clamp assemblies 116 downstream past extrusion, blow molding, cooling and ejection stations spaced around the machine.

Shaft supports 106 and 108 form parts of a stationary main frame 109. Partial circumferential upstream shift or retard cam 118 is mounted on support 108 facing plate 110. Partial circumferential mold open and mold close or actuation cam 120 is mounted on shaft support 106. Partial circumferential downstream shift or advance cam 122 is mounted on support 106. The cams 118, 120 and 122 include grooves with angled surfaces for engaging cam follower rollers carried by mold clamp assemblies 116.

As illustrated in FIG. 1, each mold clamp assembly 116 includes a base 124 extending parallel to the axis of main shaft 104. Mold platens 126 and 128 are mounted on tension rods 130. Rods 130 are mounted on base 124 by supports 132 and 134 to permit movement of the platens along the rods toward and away from each other during opening and closing of mold halves 136 and 138 mounted on the platens. Mold halves 136 and 138 each have two cavities 140 and form a two cavity mold 142 when closed. Rods 130 are parallel to the main shaft axis and extend freely through passages 144, 146 in supports 132, 134. Transverse end plates 148, 150 are mounted on the opposite ends of base 124.

A pair of spaced plates 152 are mounted on plate 148 and the adjacent end of base 124. Only one plate 152 is illustrated. Pin 154 is mounted in openings in the plates 152 and extends between the plates. The pin 154 is located to one side of mold halves 136 and 138. The adjacent ends of tension rods 130 are secured to pin 154. Pivot arm 156 is rotatably mounted on pin 154 between tension rods 130. The outer end 158 of arm 156 away from the mold halves extends through an opening in plate 148 and is connected to a slide car 160 mounted on plate 148 by links 162. Slide car 160 is mounted on the side of plate 148 away from mold 142 by slide 164 to permit movement of the car back and forth in the direction of arrow 166 shown in FIG. 1. Car 160 carries a cam follower roller 168 which extends into the slot in mold open and close cam 120. Rotation of each assembly 116 with the main shaft 104 moves each follower 168 along the groove in cam 120 to shift car 160 radially inwardly and outwardly on plate 148 and rotate arm 156 between the mold open position shown in the bottom of FIG. 2 and the mold close position shown in FIG. 1 and in the top of FIG. 2.

Mold shift member 170 is located between mold platen 126 and plate 148. The upper end 172 of member 170 is bolted directly to mold platen 126. Movement of the member 170 toward plate 148 moves the mold halves from the closed position to the open position. The lower end 174 of shift member 170 is located below the mold platens and mold halves. Pivot link 176 is rotatably connected to the inner end 178 of arm 156 and to mold shift member 170. The pivot connection between link 176 and member 170 is located halfway between the upper end 172 and lower end 174 of shift member 170 to balance forces.

Shift rod 180 is located under base 124, extends parallel to the axis of main shaft 104 and is moveable along the base. One end of the shift rod 180 is connected to the lower end 174 of shift member 170. Pivot link 176 and adjacent end 178 of arm 156 form a two link extendable and retractable drive 182 for opening and closing mold halves 136 and 138.

Cross pin 184 is mounted on the ends of tension rods 130 extending past mold half 136 and rotatably supports pivot arm 186. The lower end 188 of arm 186 is connected to the adjacent end of shift rod 180 by pivot link 190. The upper end 192 of arm 186 is connected to mold clamp rod 194 by pivot link 196. Clamp rod 194 extends freely through support 132 and is connected to platen 128 through dished washer spring pack 198. The shift rod 180, arm 186, rods 130 and 194 and member 170 are part of a mold shift mechanism 200 for opening and closing mold half 136 in response to movement of shift member 170. The mechanism 200 is connected to the extendable and retractable drive 182 to move mold half 136 through mold shift member 170, rod 180, arm 186 and rod 194.

As shown in FIG. 1, plates 148 and 150 include lower ends 204 and 206 extending below base 124. Pivot support rod 208 extends between ends 204 and 206 parallel to base 124 and to the axis of main shaft 104. Rod 208 extends through pivot bearings 207 mounted on plates 110, 112 and 114 to mount the mold clamp assembly on the rotary frame 102 and permit rotation of the assembly 116 around the rod as follower rollers 210 and 212 move along grooves in shift cams 118 and 122.

Cam follower roller 210 is mounted on plate end 204, below rod 208. Roller 210 engages the groove in mold shift or advance cam 122. Cam follower roller 212 is mounted on plate 150 above pivot support rod 208 and engages the groove in shift cam 118. During rotation of frame 102, the angled surfaces in cams 118 and 122 pivot the assemblies 116 back and forth about rods 208 to shift the molds upstream and downstream relative to the rotating frame 102.

Each mold clamp assembly 116 includes a blow pin unit 214 suitably mounted on the downstream facing side 216 of mold half 136. A pressure cylinder drive 137 on mold half 136 moves the unit between a retracted position shown in FIG. 5A and a blow position shown in FIG. 5B. Each mold half 136, 138 includes a blow unit mounting plate 218 which extends over one edge of a blow pin unit 214 and holds the blow pin unit against the downstream side of the closed mold with blow pins 220 located above neck cavities 222 in the closed mold. The blow pin unit includes pressure cylinders 224 for extending the blow pins into the cavities. The blow pins also include conventional blow passages for flowing compressed gas into parison segments captured in the cavities during blow molding. FIG. 6 illustrates a first blow pin unit 214a in the retracted position and a second blow pin unit 214b in a work position over a mold 142. When in the work position, the blow pin unit 214b is located in gap 226 between adjacent mold clamp assemblies 116.

Molds 142 each include two cavities 140. Vertical rotary blow molding machine 100 includes two flow heads 228 located on the main frame of the machine in alignment with the closing faces of molds 142 and below the position of the molds when the molds are fully closed by drive 182. See FIGS. 3 and 4. Each flow head 228 extrudes a like parison 230 vertically upwardly at the same extrusion rate or speed for capture in one cavity of each mold 142 as the molds are moved vertically above the flow heads and closed. Parisons 230 are identical and are each extruded vertically upwardly at a speed equal to the upward speed of the mold closing on the parisons. The closed mold moves vertically upwardly above the flow heads to align the captured parisons extending between the flow heads and the mold for capture by the next or upstream open mold which is rotated past the flow heads and closed on the aligned parisons. Because the parisons are identical and are extruded at the same speed, a single controller 233 is required for the two flow heads 228 and single or plural extruders 235 may be used to flow resin to both flow heads.

Each mold 142 includes a parison knife mounted on the upstream side of the mold for severing the parisons 230 after the next or upstream mold has closed on the parisons. This mold holds the parisons in alignment for capture by the next upstream mold. The parison knives are conventional and are not illustrated in the drawings.

Mold clamp assemblies 116 are mounted on the rotary sub-frame 102 of machine 100 at pivot support rods 208 and rotate continuously around the axis of the main shift 104 during operation of the machine. At the same time, the mold clamp assemblies rotate back and forth around pivot rods 208 to shift the molds downstream and upstream on the rotating frame 102. This shifting moves the molds 142 back and forth around rods 208 through an angle of 22½° between lead or downstream positions and trailing or upstream positions.

During operation of machine 100, rotary sub-frame 102 is rotated around the axis of main shaft 104 at a constant speed in the direction of arrow 232 shown in FIGS. 3 and 4. The circumferential position of a mold clamp assembly on frame 102 is identified by the circumferential position of the pivot support rod 208 in the assembly starting at the 0° position extending horizontally to the right of the main shaft as shown in FIG. 3 and corresponding 90°, 180° and 270° positions and the return 360° position, as also illustrated in FIG. 3.

Frame 102 rotates each assembly 116 360° around main shaft 104. Follower roller 168 is moved into and along the groove in mold open and close cam 120. This cam extends 115° around the main shaft from the 239° position to the 354° position. The cam includes a radially inward 15° mold open surface 234 located upstream of the 270° position and a 15° radial outward mold close portion 236 located shortly before the 360° position for closing the molds on parisons 230.

Figure 2:
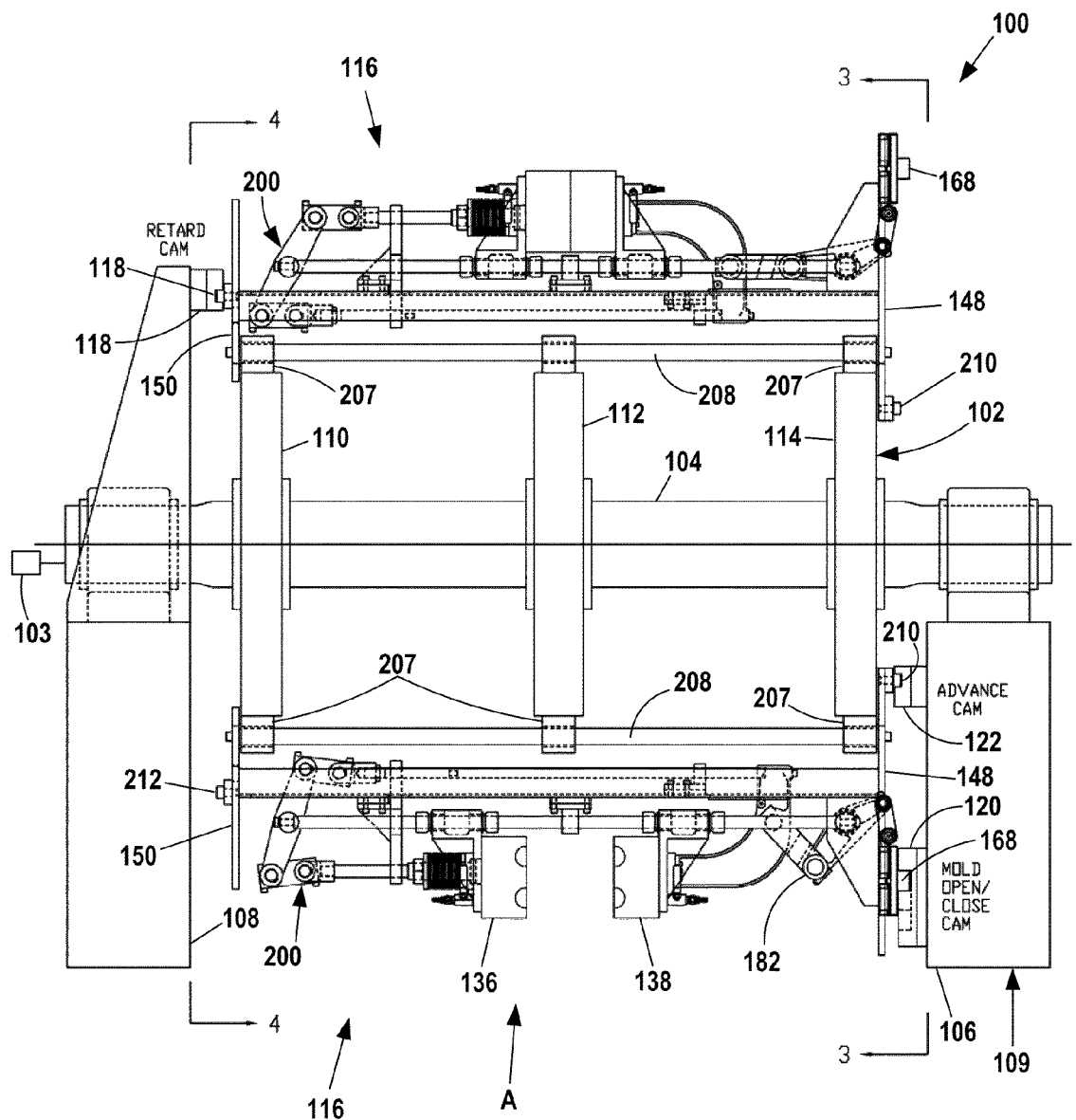
FIG. 2 is a side view of a vertical rotary blow molding machine illustrating mold clamp assemblies at the top and bottom of the machine with other assemblies and components broken away.

With the mold halves 136, 138 in the open position and drive 182 retracted as shown at the bottom of FIG. 2, rotation of shaft 104 moves the open mold halves past extrusion station 113 to move rotary cam follower 168 along the slot in cam 120 and along radially outward mold close surface 236. This movement rotates arm 156 to extend drive 182 and move shift member 170 away from plate 148. Movement of the shift member moves mold half 138 from the open position to the closed position. Movement of the shift member also actuates mold shift mechanism 200 to move shift rod 180, rotate arm 186 and move mold half 136 from the open position to the closed position. The connection between rod 194 and spring pack 198 is adjusted so that the spring pack is compressed when the mold is closed.

During and after closing of the mold, the clamp force exerted on mold half 136 is transmitted directly to drive 182 through mechanism 200. An equal and oppositely directed clamp force is exerted on mold half 138 and is transmitted to drive 182 directly through member 170. Clamping forces are not transmitted through rotary frame 102. The mold shift mechanism floats on the mold clamp assembly and is not connected to the rotary frame 102. As a result, frame 102 is not subjected to bending moments by the high clamp forces holding mold halves 136, 138 closed. The frame need not be strengthened against bending moments. Smaller, more efficient motors may be used to operate the machine. The molds are opened when rotation of the frame 102 moves follower roller 168 along mold open surface 234 of cam 120.

Rotation of each mold clamp assembly about rod 208 and resulting upstream and downstream shifting of the mold are controlled by an assembly drive including upstream shift drive 117 and downstream shift drive 119. Upstream shift drive 117 includes cam 118 on the main frame and follower roller 212 on each mold clamp assembly and rotates the assemblies upstream on the rotating frame as the molds close on the parisons. Downstream shift drive 119 includes cam 122 on the main frame and followers 210 on the assemblies. The downstream shift drive 119 rotates the mold assemblies about rods 208 in a downstream direction to position the assemblies for upstream movement by drive 117.

Cam 118 extends 185° around the main shaft from the 337° position to the 162° position and includes an inwardly extending downstream shift cam surface 238 extending 22½° around the main shaft for rotating the mold clamp assemblies 116 about rods 208 and shifting the molds in an upstream direction, counter to rotation of frame 102 as indicated by arrow 240 shown in FIG. 3. The remainder of cam 118 is circumferential so that movement of follower rollers 212 through this portion of the cam does not rotate the assemblies 116 or shift the molds.

Cam 122 extends slightly greater than 180° around the main shaft from the 155° position to the 340° position and includes a radially outward extending cam surface 242 for rotating the mold clamp assemblies in the direction of arrow 244, as shown in FIG. 3, to shift the mold in the downstream direction. Surface 242 extends about 35° around the main shaft at the 270° position. The remainder of cam 122 is circumferential.

As shown in Figs. 3 and 4, pivot rods 208 are located on frame 102 radially inwardly from the molds. The downstream shift drive 119, advance cam 242 and followers 210 which engage cam 242 are located radially inwardly from the pivot rods 208. Drive 119, cam surface 242 and follower rollers 210 are located radially inwardly of rods 208.

The upstream shift drive 117, retard cam 234 and followers 168 which engage cam 234 are located radially outwardly of pivot rods 208 and radially inwardly from the mold halves 136. The downstream shift. drive 119 is located radially inwardly from upstream shift drive 117 with rods 208 between the two drives. The mold open and mold close cams 234, 236 are located adjacent the mold halves in clamp assemblies 116, outwardly from drives 117 and 119.

The cycle of operation of machine 100 will be explained by describing movement of one mold clamp assembly 116 through a 360° revolution around shaft 104 starting with the pivot support rod 208 for the assembly at the 320° position indicated by A in FIG. 3. In this position, follower roller 168 is in a circumferential portion of cam 120 and holds the mold halves 136, 138 in the open position. Follower roller 210 is in a circumferential portion of cam 122 and holds the assembly with the mold in the circumferential advanced or downstream position on frame 102. Follower roller 212 is upstream from the entrance to cam 118.

Rotation of frame 102 moves the mold assembly counter-clockwise as shown in FIG. 3 to position B where the open mold halves move freely to either side of flow heads 228, Continued rotation of the frame moves follower roller 212 into cam 118. Follower rollers 210 and 212 are in circumferential portions of their respective cams 122 and 118 and stabilize the assembly 116 during mold closing. Follower roller 168 moves along mold close portion 236 of cam 120 to close the mold halves on upwardly extruded parisons 230 at position C. During closing of the mold, the parisons are held in alignment, with. the flow heads and move vertically above the flow heads with the closed mold in the next downstream assembly 116. After the mold closes, roller 210 moves out as cam 122.

During movement of the assembly from position C to position D follower roller 212 moves along cam surface 238 to counter rotate the assembly 116 upstream so that the mold is shifted upstream and slowed to the speed of the parisons and the next downstream mold. The circumferential speed of the mold is reduced to less than the circumferential speed of the rotary frame and matches the extrusion rate for parisons 230.

The mold halves are fully closed on the parisons when in position C with the cavities in alignment with the parisons and with the mold halves moving vertically upwardly above the flow heads with the parisons. During mold closing, the prior, downstream closed mold at position D holds the parisons in alignment for capture as it moves vertically upstream and its cam follower roller 212 moves along cam surface 238.

FIG. 3 illustrates that the mold in the assembly at position C closes with the lead or downstream mold surface immediately adjacent the trailing or upstream surface of the mold in the assembly at position D and with the molds aligned and the mold cavities in axial alignment. This reduces flash extending between the molds. Both molds move vertically together above the flow heads. After the mold in the assembly at position C is closed, the parison knife mounted on the downstream end of the closed mold at position D is actuated to sever the plastic extending between the two molds.

After the parisons extending between the two molds in the assemblies at positions C and D are severed, continued rotation of the frame 102 moves follower 212 on the assembly at position C along cam surface 238 to rotate the assembly in the direction of arrow 240 to shift the closed mold in the assembly in the upstream direction and open a gap 226 between the molds. The gap 226 between adjacent molds is maintained until the mold assembly is rotated around to position O and follower 210 moves along cam surface 242.

Gap 226 opens when the assembly is at position D. The blow pin unit 214 on the mold in the assembly is then shifted by cylinder drive 137 from the retracted position shown in FIG. 5A to the inner work or blow position over the closed mold halves, as illustrated in FIG. 5B. The unit 214 engages plates 218. Retracted blow pins 220 are positioned over the neck cavities 222 in the closed mold. The pressure cylinders 224 are actuated to extend the blow pins into the blow cavities and pressure-form the plastic in the cavities to provide finished necks. Blow gas is flowed into the parisons to blow mold the parisons against the cavities. The blow pin units are maintained on the molds in the position shown in FIG. 6 during rotation of the mold clamp assembly 116 from position D to position O. See FIG. 3. During this time, the blown parisons cool and set to form blow molded bottles with finished necks.

Movement of the assembly 116 from position O moves follower roller 168 along mold open surface 234 to open the mold halves for ejection of the blown bottles at about the 270° position. Movement of cam follower roller 210 along cam advance surface 242 of cam 122 rotates the assembly 116 in the direction of arrow 244 to shift the open mold downstream as the assembly is returned to position A to complete a cycle of operation.

Partial circumferential cams 118 and 122 in the shift drives 117 and 119 control the rotary position of the mold clamp assemblies on rods 208 as the assemblies are rotated through cycles of operation. The ends of cams 118 and 122 overlap to assure that one of the followers is moved into the forward end of one cam before the other of the followers moves out of the trailing end of the other cam.

The molds 142 used in vertical rotary blow molding machine 100 blow captured parison segments by inserting blow pins in neck cavities. If desired, machine 100 may be provided with molds having cavities including blow domes adjacent the neck portions of the bottle cavities and with blow needles for puncturing parison portions captured in the blow domes and flowing compressed gas into the captured portions to expand the parisons against the cavities to blow mold bottles. Blow pin units would not be provided. A machine with blow dome cavities and blow needles would manufacture blow molded bottles as described with reduced flash and simplified extrusion equipment.

The parisons 230 are extruded upwardly at a speed which is less than the circumferential speed of the mold due to the upstream rotation of the mold. The cavities in the mold which close on the parisons move upstream at the same speed as the molds move upstream during closing. This allows the next upstream mold to catch up with the previously closed mold so that there is a minimum gap between the molds when the next upstream mold closes on the parisons and between-mold flash is reduced.

The invention claimed is:

1. A continuous rotary blow molding machine including a main frame, a mold close cam on the main frame; a rotary frame on the main frame; the rotary frame having an axis of rotation; a motor for rotating the rotary frame around the axis of rotation at a constant speed; a plurality of mold clamp assemblies mounted on and spaced around the rotary frame, each mold clamp assembly including a blow mold having two opposed mold halves movable toward and away from each other in a direction parallel to the axis of rotation, the mold halves defining a mold cavity when the mold is closed, a mold close cam follower engaging the mold close cam, and a mechanical connection between the mold close cam follower and each mold half whereby shifting of the mold close cam follower by the mold close cam closes the mold; a flow head to extrude a first continuous parison downstream for capture by successive molds as the molds are rotated downstream and past the flow head; and an upstream mold-shift mechanism for each mold clamp assembly, wherein each upstream mold-shift mechanism shifts a mold in an upstream direction on the rotary frame after the rotary frame rotates the mold in the assembly in a downstream direction over the parison and the mold actuation cam follower closes the mold on the parison to position the closed mold adjacent to the next upstream mold and reduce flash between the molds.

2. The machine as in claim 1 wherein each mold clamp assembly is rotatably mounted on the rotary frame and each upstream mold-shift mechanism rotates a mold clamp assembly upstream.

3. The machine as in claim 2 including an upstream shift cam on the main frame and wherein each mold clamp assembly includes a shift cam follower engaging the upstream shift cam.

4. The machine as in claim 2 wherein the upstream mold-shift mechanism rotates each mold clamp assembly upstream about an axis parallel to the axis of rotation.

5. The machine as in claim 1 wherein each mold clamp assembly includes a base supporting a mold, and a rotary connection between the base and the rotary frame for rotating the mold clamp assembly around an axis parallel to the axis of rotation.

6. The machine as in claim 1 wherein said mold-shift mechanisms include an upstream shift cam on the main frame and a downstream shift cam on the main frame, and each mold clamp assembly includes two shift can followers with each cam follower engaging one shift cam.

7. The machine as in claim 6 wherein the shift cams are on opposite sides of the main frame.

8. The machine as in claim 1 including a downstream mold-shift mechanism.

9. The machine as in claim 1 wherein each mold has a second mold cavity, and including a second flow head on the main frame spaced radially outwardly from the first flow head to extrude a second continuous parison downstream, and a single extruder for flowing resin to both flow heads.

10. The machine as in claim 9 including a single controller for both flow heads.

11. A continuous rotary blow molding machine including a main frame, a mold actuation cam on the main frame, and an upstream shift cam on the main frame; a rotary frame on the main frame; a drive for continuously rotating the rotary frame around an axis of rotation at a constant speed; a plurality of mold clamp assemblies on and spaced around the circumference of the rotary frame; a rotary connection between each mold clamp assembly and the rotary frame, each mold clamp assembly including a blow mold, a mold actuation cam follower engaging the mold actuation cam, a mechanical connection between the actuation cam follower and the blow mold to open and close the blow mold, and an upstream shift cam follower engaging the shift cam; a first parison extruding flow head to extrude a parison for capture in cavities in molds rotated past the flow head; wherein during downstream rotation of each open mold past the flow head, the upstream shift cam moves the shift cam follower to rotate the assembly supporting such mold in an upstream direction so that the mold is moved adjacent to the next upstream mold when closed, wherein between-mold flash is reduced.

12. The machine as in claim 11 including a second parison extruding flow head, said first and second flow heads located at different distances from the axis of rotation of the rotary frame, each mold including radially spaced first and second mold cavities; and a single resin extruder for flowing resin to both said flow heads.

13. The machine as in claim 12 wherein the extrusion rate for each parison equals the rate at which the molds move downstream during closing, wherein the molds move at the same speed as the parisons when closed.

14. The machine as in claim 11 wherein each mold clamp assembly includes a blow pin mounted on one mold half.

15. The machine as in claim 14 wherein each mold clamp assembly includes a drive for moving the blow pin from a retracting position to a position in a gap between adjacent molds.

16. The machine as in claim 1 wherein the flow head extrudes the first parison upwardly.

17. The machine as in claim 16 wherein the axis of rotation is horizontal and the flow head extrudes a vertical parison.

18. The machine as in claim 1 wherein the flow head extrudes a parison at a speed less than the circumferential speed of the rotary frame.

19. The machine as in claim 1 including a rotary connection between each mold clamp assembly and the rotary frame, each rotary connection located radially inwardly of the mold.

20. The machine as in claim 19 wherein each mold clamp assembly includes a first cam follower engageable with a first cam on the main frame to rotate the mold clamp assembly in the upstream direction after the rotary frame moves the mold in the assembly in a downstream direction over the parison and the mold close cam follower closes the mold on the parison.

21. The machine as in claim 20 wherein the first cam is located radially between the axis of rotation and the rotary connections.

22. The machine as in claim 20 wherein each mold clamp assembly includes a second cam follower engageable with a second cam on the main frame, wherein movement of the second cam follower in the second cam rotates the mold clamp assembly downstream when the mold clamp assembly is away from the flow head.

23. The machine as in claim 22 wherein said first and second cams are located radially inwardly from the molds.

24. The machine as in claim 23 wherein the flow head extrudes a parison at a speed less than the circumferential speed of the rotary frame at the molds.

25. The machine as in claim 24 including a second mold cavity in each mold, second flow head and a single extruder for flowing resin to each flow head.

26. The machine as in claim 25 including a single controller for both flow heads.

27. The machine as in claim 25 wherein the flow heads extrude parisons upwardly.

28. The machine as in claim 27 wherein the axis of rotation is horizontal, and the flow heads extrude vertical parisons.

* * * * *